3,388,971
PRODUCTION OF HYDROGEN
Seymour C. Schuman, Rocky Hill, N.J.
(360 Jefferson Road, Princeton, N.J. 08540)
Filed June 7, 1965, Ser. No. 461,768
2 Claims. (Cl. 23—212)

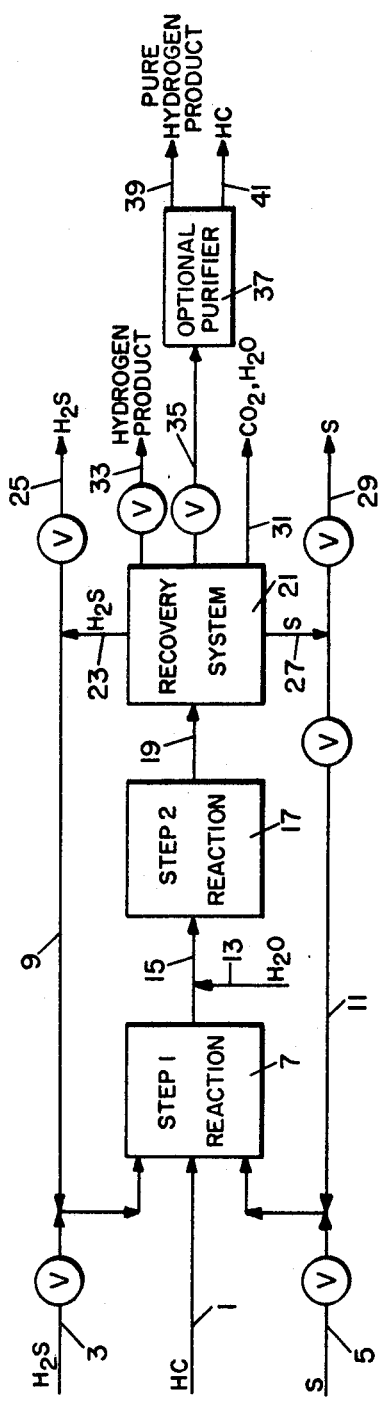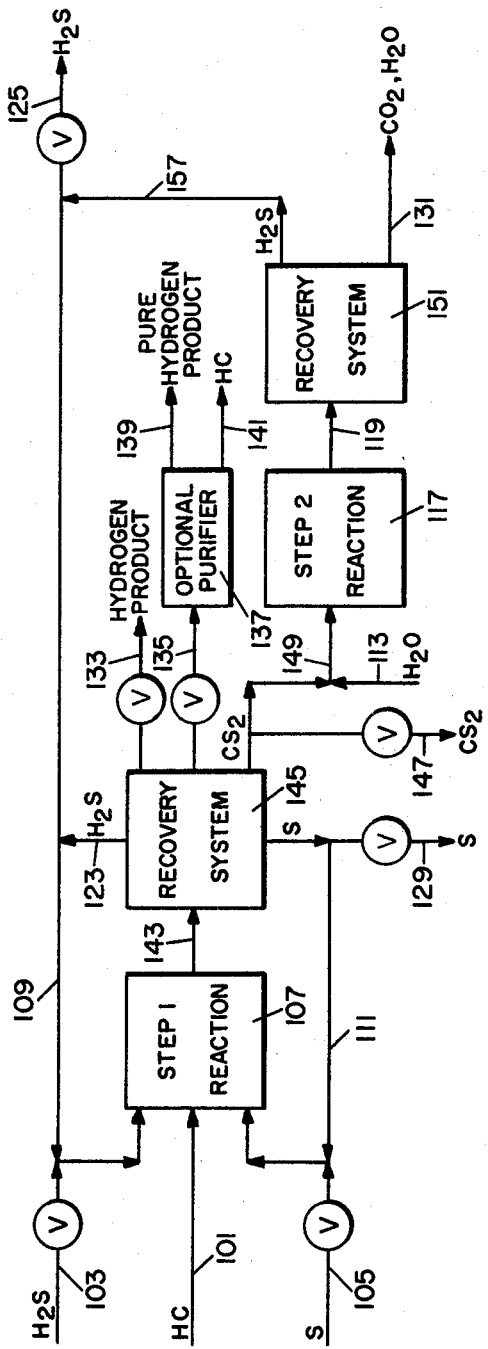

ABSTRACT OF THE DISCLOSURE

Hydrogen is produced by contacting a light hydrocarbon feed with hydrogen sulfide at elevated temperatures to produce hydrogen and carbon disulfide, and then, contacting such carbon disulfide with steam to produce the predominant part of the hydrogen sulfide required in the first step.

The present invention relates to a new and improved process for producing hydrogen.

More particularly, my invention avoids certain deficiencies of the steam reforming process commonly utilized to produce hydrogen and, at the same time, takes advantage of the availability of net hydrogen sulfide and/or elemental sulfur at sites where it may be desirable to produce hydrogen.

As is well known, the conventional steam reforming process, such as for example:

$$CH_4 + H_2O = CO + 3H_2 \tag{1}$$

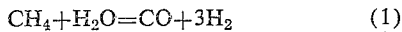

$$CO + H_2O = CO_2 + H_2 \tag{2}$$

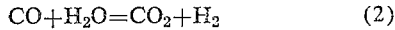

suffers from the following deficiencies:

A. The catalyst used in large amount for reaction (1) is poisoned by even slight traces of sulfur, so that the hydrocarbon feed must be sulfur-free.

B. Reaction (2) is thermodynamically unsatisfactory, so that large excesses of steam and highly active catalysts are required for high carbon monoxide conversions.

C. Even at the best conditions, carbon monoxide conversions are not complete. Since carbon monoxide is a poison for many of the catalysts employed in subsequent reactions where the hydrogen may be employed (Kirk-Othmer, Encyclopedia of Chemical Technology, first edition, volume 3, page 182, Interscience Encyclopedia, New York, 1949), an additional step is needed to remove such carbon monoxide. This step (Petroleum Refiner, September 1964, volume 43, No. 9, page 231) is costly and represents a substantial part of overall hydrogen production costs.

My invention comprises two primary steps, representable generically by the following chemical equations:

$$CH_4 + 2H_2S = CS_2 + 4H_2 \tag{3}$$

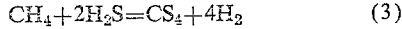

$$CS_2 + 2H_2O = 2H_2S + CO_2 \tag{4}$$

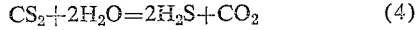

Thus as shown, a light hydrocarbon is reacted with hydrogen sulfide to produce carbon disulfide and hydrogen. With or without intermediate separation, the carbon disulfide is then reacted with steam to reobtain a large part or all of the hydrogen sulfide required in the first step. Various light hydrocarbons commonly available can be used as the feed material for the first step.

The invention may be utilized in various ways, for example, as follows:

A. Where little or no net hydrogen sulfide is available substantially all of the carbon disulfide produced in the first step may be fed to the second step and a maximum recovery of hydrogen sulfide obtained in the second step to resupply that needed in the first step.

B. Where net hydrogen sulfide is substantially available, such as in a sour natural gas for example, some elemental sulfur or carbon disulfide or both may be removed as by-products from the first step, with the remainder reacted in the second step to supply the hydrogen sulfide deficiency between that required and the net available.

C. Where net hydrogen sulfide is substantially available, no by-products may be removed but part of the hydrogen sulfide produced in the second step may not be fed back to the first step.

D. Where little or no net hydrogen sulfide is available, net hydrogen sulfide requirements may be supplied using small quantities of elemental sulfur, either by combining such sulfur with part of the hydrogen produced in a separate step to create the net hydrogen sulfide required, or by directly feeding such sulfur together with a substantially greater amount of reconverted hydrogen sulfide to the first step. Where such elemental sulfur is used, hydrogen yields are reduced over those shown in Equations 3 and 4.

It is obvious that there are many other possibilities for utilizing this invention, for example combining B and C to produce relatively small amounts of carbon disulfide as by-product, without feeding all of the hydrogen sulfide back to the first step, and the like.

The process of my invention does not suffer from any of the above-noted deficiencies of the steam reforming process. In fact, the best application of my invention is to produce hydrogen for the hydrofining and hydrocracking of petroleum and its fractions, since the catalysts used for such processes, although poisoned by small quantities of carbon monoxide, are not poisoned by sulfur or its compounds (most of the catalysts used are actually sulfides—see McKinley, Hydrodesulfurization of Liquid Petroleum Fractions in Catalysis, by P. H. Emmet, volume V, pp. 450-475, Prentice-Hall, 1957). Furthermore, for such hydrofining and hydrocracking processes, the hydrogen supplied need not be very pure; gas may be readily used containing only 60-95% hydrogen with the remainder hydrocarbons and hydrogen sulfide. Also, as previously described, my invention takes advantage of the fact that hydrogen sulfide and/or elemental sulfur may be substantially available or very inexpensive, particularly in certain locations where hydrogen may be required for the hydrofining or hydrocracking of petroleum and its fractions.

Additional objects and advantages of my invention will be more fully apparent from a study of FIGURES 1 and 2 in conjunction with the examples given below. FIGURES 1 and 2 illustrate, in a schematic manner, apparatus for carrying out processes in accordance with my invention. For simplicity, conventional vessels, heaters, coolers, pumps, compressors and the like which would be employed in commercial embodiments are not shown. For the same reason, some of the various optional possibilities are schematically illustrated by valves in FIGURES 1 and 2, which, it should be understood, may or may not be employed in any one given embodiment.

In FIGURE 1, a light hydrocarbon from source 1 is mixed with hydrogen sulfide from line 9 and elemental sulfur from line 11 obtained as will be described, and fed to the first step reactor 7. The feed components may be preheated separately or together as desirable. Make-up hydrogen sulfide from source 3 and/or sulfur from source 5 may also be supplied to the first step reactor. The reaction is carried out at 1500° F.–2000° F. as will be described, the products leaving the reactor and cooled with the desired quantity of water and/or steam supplied from 13 required for the second step reaction. The combined feed containing carbon disulfide, hydrogen, and steam together with unreacted hydrocarbons, hydrogen sulfide and sulfur then enters the second step reactor 17 through line 15.

In the second step reaction the carbon disulfide is quantitatively converted to hydrogen sulfide and the product gases, comprising hydrogen sulfide, sulfur, carbon dioxide, steam, hydrocarbons and hydrogen issues from the reactor through pipe 19 to enter the recovery system 21. In all cases the recovery system separates out hydrogen sulfide, a substantial quantity of which is recycled through lines 23 and 9 to the first step reaction. Elemental sulfur is also separated out at 27; it may either be recycled to the first step reactor by line 11 or withdrawn as product at the outlet 29. Carbon dioxide and water are also separated, shown schematically as leaving the recovery system at point 31.

A small quantity of hydrogen sulfide may likewise be removed with the products, either at 25 as shown, or with the carbon dioxide and water at 31. After removal of these components, the impure hydrogen product may be withdrawn from the system at 33. Optionally, the impure product may be passed through a low temperature system 37 to separate out unreacted hydrocarbons at 41, and a relatively pure hydrogen product at 39. The unreacted hydrocarbons may be recycled to the first step reaction if desired.

In FIGURE 2, which illustrates another embodiment of this invention, the feeds to the first step reactor are as in FIGURE 1. However, the products from this step pass directly to a recovery system 145, producing separated streams of hydrogen sulfide 123 and sulfur 129 which are treated in the same way as in FIGURE 1. In FIGURE 2, however, a carbon disulfide stream is also separated out, part of which may be withdrawn at 147, but most of which, mixed with steam from source 113 is passed to the second step reactor through line 149. The recovery system also separates out an impure hydrogen product which may be withdrawn as product from 133, or purified as in FIGURE 1 in a purifier 137 to be withdrawn substantially pure from 139.

Thus, it is a feature of the arrangement of FIGURE 2 that the feed to the second step reactor 117 is substantially only carbon disulfide and steam. The effluent from the second step, comprising substantially only hydrogen sulfide, carbon dioxide and unreacted steam, passes through line 119 into the recovery system 151 where most of the hydrogen sulfide separated out in the line 157 is returned to the first step reactor 107 through line 109; however, some may be withdrawn either in line 125 or with the carbon dioxide and water shown withdrawn at outlet 131.

The hydrocarbon feed to this invention may comprise natural gas, refinery gas, liquefied propane gas, light naphtha or light natural gasoline. Essentially these are hydrocarbons of a carbon number from one to seven. As indicated previously, hydrogen sulfide, elemental sulfur or organic sulfur compounds may be present and do not have to be removed; in fact, sour natural gas or a sour refinery gas (such as that obtained from catalytic cracking) are preferred feeds for this invention.

The first step reaction is carried out at between 1500° F. to 2000° F. at substantially atmospheric pressure or slightly above. The reaction is endothermic and heat must be supplied to maintain the reaction temperature. The reaction may be carried out non-catalytically or in the presence of a contact agent. Use of a contact agent permits reduction of the reaction temperature to the lower limits of those specified.

Since the first step reaction may be equilibrium limited at certain conditions, it may be feasible to operate this reaction stagewise, condensing out sulfur and carbon disulfide between stages and reheating the unconverted hydrocarbons and hydrogen sulfide for passage to a second stage. In such a case, very high hydrocarbon conversions may be obtained at the lowest limits of temperature specified. Sulfur condensed out between stages may be recycled to the first stage while carbon disulfide is bypassed to the second step. Such a procedure is well known by those familiar with the art for increasing the conversion of equilibrium limited reactions; in most cases of this invention, however, such a procedure is not required since satisfactory conversions are generally obtained without staging.

An important equilibrium is also obtained in the first step with respect to elemental sulfur, viz.

$$2H_2S \rightleftharpoons 2H_2 + S_2 \qquad (5)$$

Thus, especially at the relatively high temperatures of those specified here, elemental sulfur may be found in the first step effluent. Such elemental sulfur may be withdrawn as a product, or recycled, or passed with other first step effluent components to the second step, as desirable. It should also be noted that if elemental sulfur is present in the feed, it may be converted to a large extent by the reverse of Equation 5 to that permissible in accordance with the equilibrium.

The second step reaction may be carried out at as low a temperature at 400° F. with active catalysts, or less preferably up to 1300° F. without catalysts. Convenient pressures are from atmospheric to 400 p.s.i.g. (pounds per square inch gauge). Steam rates may vary from only slightly over that required stoichiometrically to a maximum excess of 100%. Because the second step reaction is exothermic, the reaction may be carried out adiabatically by passing the feed into the reactor at below reaction temperature, or isothermally by using a heat exchanger, or by any other procedure conventional in the art. Since the use of a solid catalyst is preferable, fluid or moving bed reaction systems may be useful.

The recovery systems indicated in FIGURES 1 and 2 are conventional, as is the optional purification step for the hydrogen product. The systems are simplified by the fact that carbon monoxide, sulfur dioxide and organic sulfur compounds are not usually present and only traces of carbonyl sulfide are obtained.

EXAMPLE 1

All data in this example are converted to the basis of 1000 s.c.f. (standard cubic feet) of fresh feed.

Example 1 illustrates the simple application of this invention on a typical slightly sour natural gas containing 0.6% hydrogen sulfide, in accordance with FIGURE 1. Hydrogen sulfide is recycled in line 9, and elemental sulfur in line 11. A small amount of elemental sulfur corresponding to the hydrogen sulfide in the feed is withdrawn as product at 29.

The first step reaction is carried out over a nickel sulfide catalyst at 1700° F. The hydrogen sulfide recycle is controlled to provide an $H_2S/C$ volume ratio of 2.7 (a 35% excess of water) to the second step. The second step reaction is carried out at 490° F. on an activated alumina catalyst, substantially converting all of the carbon disulfide fed. The recovery system is operated to provide the hydrogen sulfide and elemental sulfur recycle streams described above. The optional purifier is not employed in this case and 3199 s.c.f. of 91% hydrogen containing undetectible quantities of carbon monoxide and carbonyl sulfide is obtained as the primary product. A by-product of about 0.5 pound of elemental sulfur is withdrawn at 29.

Thus, this example of the invention illustrates the use of slightly sour natural gas to produce hydrogen suitable for petroleum hydrogen applications, at the same time as converting the small amount of hydrogen sulfide in the feed to elemental sulfur, avoiding the need for subsequent air pollution measures. No external supplies of hydrogen sulfide are employed. Data on the various process streams used in Example 1 are provided in Table 1.

EXAMPLE 2

All data in this example are converted to the basis of 1000 s.c.f. (standard cubic feet) of fresh feed.

This example illustrates the use of this invention on a very sour refinery gas containing 8.4% hydrogen sulfide e.g., the pooled gas from refinery operations including ethylene and propylene recovery. The flow scheme is again as in FIGURE 1. In this case, however, the net sulfur content of the feed is converted to a substantial quantity of an elemental sulfur by-product, with some hydrogen sulfide and carbon disulfide losses. Again the hydrogen product is obtained without use of the optional purifier, and is completely satisfactory for petroleum hydrogenation applications.

The first step reaction is carried out over an activated bauxite catalyst at 1900° F. The hydrogen sulfide recycle is adjusted to provide an $H_2S/C$ volume ratio of about 3.7 to the first step. No elemental sulfur recycle is employed.

The effluent from the first step is quenched with water to provide an $H_2O/CS_2$ volume ratio of about 2.5 to the second step. The second step reaction is carried out at 425° F. on a silica-alumina catalyst with a very high conversion of the carbon disulfide fed.

The recovery system is designed and operated to produce the hydrogen sulfide recycle mentioned above, 3014 s.c.f. of 96.8% hydrogen, 5.1 pounds of elemental sulfur, and a waste stream of carbon dioxide containing small quantities of hydrogen sulfide and carbon disulfide.

Table 2 illustrates the compositions of the various process streams, showing that a very sour refinery gas may be successfully used to produce hydrogen of good purity, while at the same time converting 72% of the sulfur content of the refinery gas to elemental sulfur, thereby markedly diminishing or possibly eliminating the necessity for subsequent air pollution measures.

EXAMPLE 3

All data in this example are converted to the basis of 1000 s.c.f. (standard cubic feet) of fresh feed.

Example 3 illustrates the application of this invention on a very sour natural gas containing 18.6% hydrogen sulfide. The flow scheme is as in FIGURE 2, with a satisfactory hydrogen product again obtained without the use of the optional purifier. In this case the net sulfur in the feed is substantially converted to a carbon disulfide by-product.

The first step reaction is carried out in two stages with intermediate condensation of and removal of hydrogen sulfide between stages. Both stages employ cobalt-molybdenum sulfide catalysts supported on Alundum at reaction temperatures of 1560° F. The hydrogen sulfide recycle to the first step is controlled to provide an $H_2S/C$ volume ratio of about 3. A small elemental sulfur recycle is provided to extinct net production of this material.

The effluent from the first step passes to the first recovery system which provides (a) the small elemental sulfur recycle, (b) a large part of the hydrogen sulfide recycle, (c) a carbon disulfide by-product of 18 pounds, (d) a much larger carbon disulfide stream fed to the second stage, and (e) 2978 s.c.f. of 89.9% hydrogen completely free of carbon monoxide.

The carbon disulfide fed to the second step is combined with a 50% excess of steam and converted at 625° F. over a catalyst comprising a low iron activated clay. A high conversion of carbon disulfide is again obtained, providing the remainder of the hydrogen sulfide recycle to the first step. The waste stream, essentially carbon dioxide and water, contains less than 1% of sulfur as hydrogen sulfide and carbon disulfide.

Table 3 summarizes the compositions of the various process streams. A sour natural gas is thus used to produce hydrogen of good purity, while at the same time producing substantial quantities of valuable carbon disulfide as a by-product.

EXAMPLE 4

The data in this example are converted to the basis of 500 s.c.f. (standard cubic feet) of fresh feed.

Example 4 illustrates the use of this invention on a slightly sour natural gas essentially similar to that in Example 1. However, in Example 4 the crude hydrogen produced is purified in the optional purifier in accordance with the scheme of FIGURE 2, to produce a very pure final product. The recovery system is operated economically, venting significant quantities of hydrogen sulfide in the waste gas. Thus, a small quantity of net sulfur is required as an addition to the feed, which is supplied to the extent of 1.7 pounds of elemental sulfur per 500 s.c.f. of fresh feed.

The first step reaction is carried out without catalyst at 1760° F. and 3 atmospheres pressure. In addition to the hydrocarbon and elemental sulfur fresh feed, the total feed to the first step includes three recycle streams (a) hydrogen sulfide from both recovery systems providing an $H_2S/C$ volume ratio of 2.5 in the total feed, (b) a very small amount of elemental sulfur from the first recovery system sufficient to recycle such elemental sulfur to extinction, and (c) 515 s.c.f. of a hydrocarbon stream obtained as the waste stream from the low temperature hydrogen purifier.

The effluent from the first step passes to the first recovery system which provides (a) all of the elemental sulfur recycle, (b) a large part of the hydrogen sulfide recycle, (c) a carbon disulfide stream fed to the second step and (d) a crude hydrogen stream comprising 2483 s.c.f. of 79% purity. No carbon disulfide is withdrawn as product. Elemental sulfur is, similarly, not withdrawn.

The carbon disulfide fed to the second step is combined with a 50% excess of steam and converted at 935° F. over an Alundum contact agent to obtain a high conversion of carbon disulfide. The second recovery system provides the remainder of the hydrogen sulfide recycle to the first step. The waste stream contains large amounts of carbon dioxide, smaller quantities of hydrogen sulfide and carbon disulfide and traces of carbonyl sulfide.

The crude hydrogen stream of 2483 s.c.f. of 79% purity is passed to the low temperature purifier to produce 1968 s.c.f. of hydrogen of 99.5% purity. The purifier waste gas comprising 515 s.c.f. of hydrocarbons, predominantly methane, is recycled back to the first stage as described.

Table 4 summarizes the compositions of the various process streams, showing high yields of high purity hydrogen obtained in an economical process system from natural gas.

TABLE 1.—PROCESS STREAMS IN EXAMPLE 1
[All quantities in s.c.f.]

| | Fresh Feed | Recycle to First Step | Comb. Fd. to First Step | Product From First Step | Feed to Second Step | Product From Second Step | Hydrogen Product | Other Products | Waste |
|---|---|---|---|---|---|---|---|---|---|
| $CH_4$ | 980 | | 980 | 270 | 270 | 270 | 270 | | |
| $C_2H_6$ | 10 | | 10 | 3 | 3 | 3 | 3 | | |
| $C_3H_8$ | 4 | | 4 | 1 | 1 | 1 | 1 | | |
| $H_2S$ | 6 | 3,900 | 3,906 | 2,434 | 2,435 | 3,900 | | | Neg. |
| $S_2$ | | 7 | 7 | 10 | 10 | 10 | | 3 | |
| $CS_2$ | | | | 733 | 733 | Neg. | | | Neg. |
| $H_2$ | | | | 2,925 | 2,925 | 9,925 | 2,925 | | |
| $CO_2$ | | | | | | 733 | | | 733 |
| $H_2O$ | | | | | 2,000 | 534 | | | 534 |

TABLE 2.—PROCESS STREAMS IN EXAMPLE 2
[All quantities in s.c.f.]

| | Fresh Feed | Recycle to First Step | Comb. Fd. to First Step | Product From First Step | Feed to Second Step | Product From Second Step | Hydrogen Product | Other Products | Waste |
|---|---|---|---|---|---|---|---|---|---|
| $CH_4$ | 422 | | 422 | 90 | 90 | 90 | 90 | | |
| $C_2H_4$ | 18 | | 18 | Neg. | | | | | |
| $C_2H_6$ | 111 | | 111 | 8 | 8 | 8 | 8 | | |
| $C_3H_6$ | 20 | | 20 | Neg. | | | | | |
| $C_3H_8$ | 29 | | 29 | 3 | 3 | 3 | 3 | | |
| $H_2S$ | 84 | 3,100 | 3,184 | 1,720 | 1,720 | 3,110 | | | 10 |
| $S_2$ | | | | 30 | 30 | 30 | | 30 | |
| $CS_2$ | | | | 702 | 702 | 7 | | | 7 |
| $H_2$ | 316 | | 316 | 2,913 | 2,913 | 2,913 | 2,913 | | |
| $CO_2$ | | | | | | 695 | | | 695 |
| $H_2O$ | | | | | 1,800 | 410 | | | 410 |

TABLE 3.—PROCESS STREAMS IN EXAMPLE 3
[All quantities in s.c.f.]

| | Fresh Feed | Recycle to First Step | Comb. Fd. to First Step | Product From First Step | Feed to Second Step | Product From Second Step | Hydrogen Product | Other Products | Waste |
|---|---|---|---|---|---|---|---|---|---|
| $CH_4$ | 612 | | 612 | 260 | 260 | | | | |
| $C_2H_6$ | 160 | | 160 | 30 | 30 | | | | |
| $C_3H_8$ | 42 | | 42 | 6 | 6 | | | | |
| $H_2S$ | 186 | 3,000 | 3,186 | 1,746 | | | | 1,258 | 4 |
| $S_2$ | | 2 | 2 | 2 | | | | | |
| $CS_2$ | | | | 720 | | 89 | | 631 | 2 |
| $H_2$ | | | | 2,682 | 2,682 | | | | |
| $CO_2$ | | | | | | | | 629 | 629 |
| $H_2O$ | | | | | | 1,900 | | 642 | 642 |

TABLE 4.—PROCESS STREAMS IN EXAMPLE 4
[All quantities in s.c.f.]

| | Fresh Feed | Recycle to First Step | Comb. Fd. to First Step | Product From First Step | Feed to Second Step | Product From Second Step | Hydrogen Product | Other Products | Waste |
|---|---|---|---|---|---|---|---|---|---|
| $CH_4$ | 489 | 510 | 999 | 520 | 520 | 10 | | | |
| $C_2H_6$ | 6 | 4 | 10 | 4 | 4 | | | | |
| $C_3H_8$ | 2 | 1 | 3 | 1 | 1 | | | | |
| $H_2S$ | 3 | 2,500 | 2,503 | 1,529 | | | | 988 | 17 |
| $S_2$ | 10 | 2 | 12 | 2 | | | | | |
| $CS_2$ | | | | 497 | | 497 | | 3 | 3 |
| $H_2$ | | | | 1,958 | 1,958 | 1,958 | | | |
| $CO_2$ | | | | | | | | 494 | 494 |
| $H_2O$ | | | | | | 1,500 | | 512 | 512 |

Having thus described my invention, what I claim is new and desire to secure by Letters Patent is:

1. A process of producing hydrogen as a principal product which comprises the steps of first, contacting a light hydrocarbon feed with elemental sulfur and hydrogen sulfide at elevated temperatures in excess of 1500° F. to produce hydrogen, elemental sulfur, and carbon disulfide; second, contacting such carbon disulfide with steam to produce the predominant part of the hydrogen sulfide required in said first step; third, feeding a substantial portion of such produced hydrogen sulfide to said first step; fourth, recycling said produced elemental sulfur to said first step, thereby providing said sulfur required in said first step; and, fifth withdrawing hydrogen as a product.

2. A process of producing hydrogen as a principal product which comprises the steps of, first, contacting a sour light hydrocarbon feed containing sulfur, either elemental or combined, with hydrogen sulfide at elevated temperatures in excess of 1500° F. to produce hydrogen, elemental sulfur, and carbon disulfide; second, contacting a major part of such carbon disulfide with steam to produce the predominant part of the hydrogen sulfide required in said first step; third, recycling the hydrogen sulfide from said last-named step to said first-named step; and, fourth, withdrawing, as products (a) hydrogen and (b) sulfur, either elemental or combined in an amount equivalent to the sulfur content of said hydrocarbon feed.

References Cited

UNITED STATES PATENTS

| | | | |
|---|---|---|---|
| 1,735,409 | 11/1929 | Pier et al. | 23—206 |
| 2,731,335 | 1/1956 | Odell | 23—212 X |
| 2,788,262 | 4/1957 | Adcock et al. | 23—206 |
| 3,116,970 | 1/1964 | Storp et al. | 23—181 X |

OSCAR R. VERTIZ, *Primary Examiner.*

EDWARD STERN, *Examiner.*